United States Patent [19]
Blocher, Jr. et al.

[11] 4,117,094
[45] Sep. 26, 1978

[54] PROCESS FOR SILICON AND TRICHLOROSILANE PRODUCTION

[75] Inventors: John M. Blocher, Jr., Worthington; Melvin F. Browning, Upper Arlington, both of Ohio

[73] Assignee: Texas Instruments Incorporated, Dallas, Tex.

[21] Appl. No.: 806,245

[22] Filed: Jun. 13, 1977

[51] Int. Cl.$^2$ .................. C01B 33/02; C01B 33/08
[52] U.S. Cl. .................................. 423/342; 423/350
[58] Field of Search ............................. 423/350, 342

[56] References Cited

U.S. PATENT DOCUMENTS

| | | | |
|---|---|---|---|
| 2,595,620 | 5/1952 | Wagner et al. | 423/342 |
| 3,565,590 | 2/1971 | Bracken | 423/342 |
| 3,824,121 | 7/1974 | Bradley et al. | 423/350 |
| 3,933,985 | 1/1976 | Rodgers | 423/342 X |

FOREIGN PATENT DOCUMENTS

| | | | |
|---|---|---|---|
| 213,921 | 8/1957 | Australia | 423/350 |
| 1,292,508 | 3/1962 | France | 423/350 |
| 924,545 | 4/1963 | United Kingdom | 423/350 |

*Primary Examiner*—Jack Cooper
*Attorney, Agent, or Firm*—James T. Comfort; Gary C. Honeycutt

[57] ABSTRACT

An improved method is provided for converting metallurgical grade silicon to semiconductor grade silicon, by first reacting the impure silicon with silicon tetrahalide to form a mixture of halosilanes, separating and purifying the trihalosilane, and then depositing semiconductor grade silicon by reacting the trihalosilane. The tetrahalide produced as a by-product of the deposition step is recycled to react with additional impure silicon. Improved trihalosilane yields from reacting silicon with the tetrahalide are achieved by adding hydrogen as a reactant, and by immediate quenching of the effluent with HCl. Such improved yields permit the complete system to be internally balanced so that the net production of by-products can be reduced to zero.

6 Claims, 3 Drawing Figures

PROCESS FOR SILICON AND TRICHLOROSILANE PRODUCTION

This invention relates to the production of silicon, and more particularly to methods for the production of semiconductor grade silicon from impure or metallurgical grade silicon. One aspect of the invention provides improved yields of trihalosilane obtained from reacting silicon tetrahalide with silicon. Such yields permit a balanced system, wherein trihalosilane is reacted to deposit semiconductor grade silicon, wherein the tetrahalide by-product from deposition is recycled to generate more trihalosilane, and wherein the net production of by-products can thereby be reduced to zero.

The concept of combining a silicon deposition reactor with a trichlorosilane (TCS) generator has been previously proposed, for example, by U.S. Pat. No. 3,565,590. The practical aspects of material balance were ignored, however, and thus the prior system would require a continuous supply of materials other than silicon, while continuously producing by-products not recyclable in the system. Still further, the generator of the prior system is relatively less efficient to a degree that would discourage significant implementation, due to the requirement for a disproportionately large investment in TCS generators, for a given net production of silicon.

One object of the invention, then, is to up-grade the trichlorosilane generation step in order to make the system more attractive. Another object is to integrate the generator with the deposition reactor in such a way that the net production of by-products can be eliminated.

An important feature of the invention is quenching of $SiCl_2$ in the presence of HCl in the generator, whereby the $SiCl_2$ is efficiently converted to $SiHCl_3$ without polymer formation. Although the chemistry of reacting $SiCl_2$ with HCl is well known, abrupt cooling of $SiCl_2$ was previously avoided because of polymer formation. It has now been discovered that with adequate mixing and cooling efficiency the yield of TCS is substantially enhanced by immediate quenching with HCl.

Further improvement in the efficiency of TCS generation is achieved by including hydrogen as a reactant, along with silicon tetrachloride (TET) and silicon. Thus, some of the TET is reduced by the hydrogen to yield additional TCS.

The integration of a silicon deposition reactor and a TCS generator thus becomes more economically attractive, not only because of an improved material balance, which leads to a reduced ratio of investment in generator facilities to investment in reactor facilities, but also becomes more attractive from the standpoint of eliminating the need for a continuous supply of materials other than "raw" silicon, and eliminating the net production of by-products. Specifically, all the hydrogen produced in the step of depositing semiconductor grade silicon is needed as a reactant in the initial state of TCS generation; and all the HCl produced therein is needed in the quenching stage of TCS generation. The net input to the system is silicon; and the net output is silicon.

A complete material balance, however, may not always be desirable; and accordingly, the invention is not limited to such an embodiment. It is convenient, for example, to produce a net excess of TCS and or TET, and hydrogen, as continuous products of the system, simply by the continuous addition of HCl to the system, and by adjusting the $H_2$/TET ratio in the TCS regeneration cycle.

Figure 1:
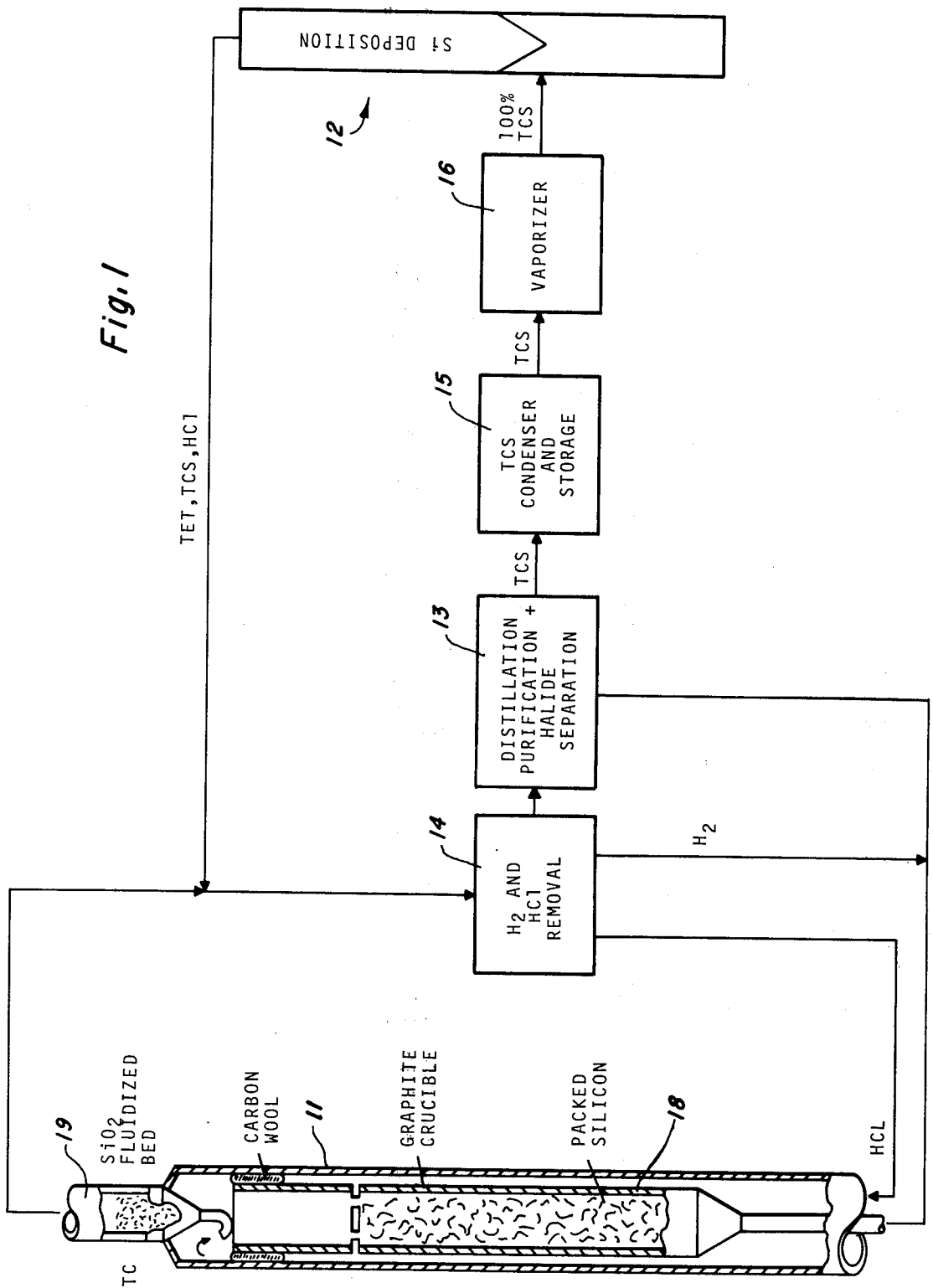
FIG. 1 is a schematic diagram of the silicon production plant of the invention, including the improved TCS generator.

In FIG. 1, the illustrated system is seen to include TCS generator 11, silicon deposition reactor 12, distillation system 13 for separating TET, TCS, and dichlorosilane (DCS), separator 14 for removing $H_2$ from the generator effluent, and $H_2$ and HCl from the reactor effluent, a TCS condenser and storage system 15, and $SiCl_2$ vaporizer 16.

Generator 11 includes a first stage 18 wherein $SiCl_2$ is formed by the reaction of TET with silicon. Also, the hydrogen reduces some TET directly to TCS. Reaction conditions includes a temperature above 1400° K. Theoretically, a temperature as high as 1800° K or higher would be preferable, in order to maximize the yield of $SiCl_2$; however, practical operation just below the melting point of silicon (1683° K) is desirable in order to avoid the processing of molten silicon.

Again theoretically, reduced pressures favor the reaction, but atmospheric pressure is suitable, and probably more economic.

Preferably, a pre-heated vaporous mixture of TET and $H_2$ are passed in contact with a particulate mass of silicon particles maintained at about 1600° K. This mass of particles could be in the form of a packed or fluidized bed depending upon operating temperature.

Flow rates are not critical, particulrly if fluidization rates are maintained.

In the second stage 19 of the TCS generator, immediate reaction with HCl during quenching is essential. The temperature is reduced below 800° C as quickly as possible in order to avoid a reversal of the reaction, or other unwanted reactions. Also, the quenching must be done in the presence of adequate HCl, in order to avoid the formation of $(SiCl_2)$ polymers. It is desirable to minimize the excess of HCl over stoichiometric to minimize the unwanted formation of TET and an increase in separation and recycle expense.

A preferred mechanism for quenching includes the immediate introduction of the $SiCl_2$ into a fluidized bed of silica particles positioned just above the bed wherin $SiCl_2$ is formed, as illustrated in FIG. 1. An equimolar flow of HCl is mixed therewith as the $SiCl_2$ enters the quenching bed. The temperature of the mixture must be reduced to 800° C or below within less than 2 seconds and preferably less than ½ second.

Distillation system 14, and separator 15 are well-known and need not be particularly described for purposes of this invention.

Silicon deposition reactor 12 may also be of any design known in the art, but is preferably a fluidized bed reactor, such as that shown in U.S. Pat. No. 3,012,861. Preferred conditions in reactor 12 include temperatures between 1100° and 1600° K, and a reactant input of pure TCS only. The flow rate should be sufficient to cause fluidization of the particulate silicon bed. For example, a temperature of 1400° K, atmospheric pressure, and a TCS flow rate of 13 lbs./hr. through a 38 mm. diameter bed of silicon particles having an ave. diameter of about 600 microns are suitable conditions.

Figure 2:
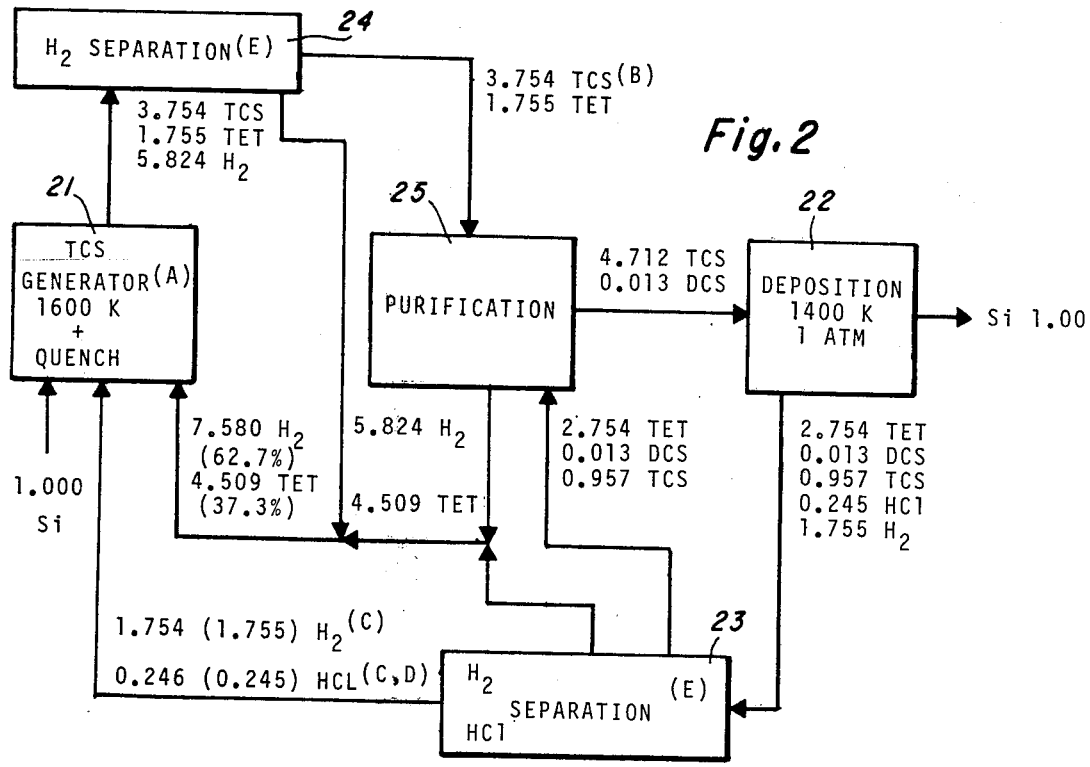
FIG. 2 is a schematic diagram of a balanced system, wherein the net input and net output are silicon only.

In FIG. 2 an example of the system of the invention is shown, including generator 21, deposition reactor 22, separators 23 and 24, and distillation system 25. The numbers in the drawing, which label the flow streams, are the molar amounts of materials required to balance the system for a net reduction of by-products to zero.

As indicated by the material balance, in excess of 60% of the TET is converted to TCS in a single pass, which is a substantially greater efficiency than heretofore known.

Figure 3:
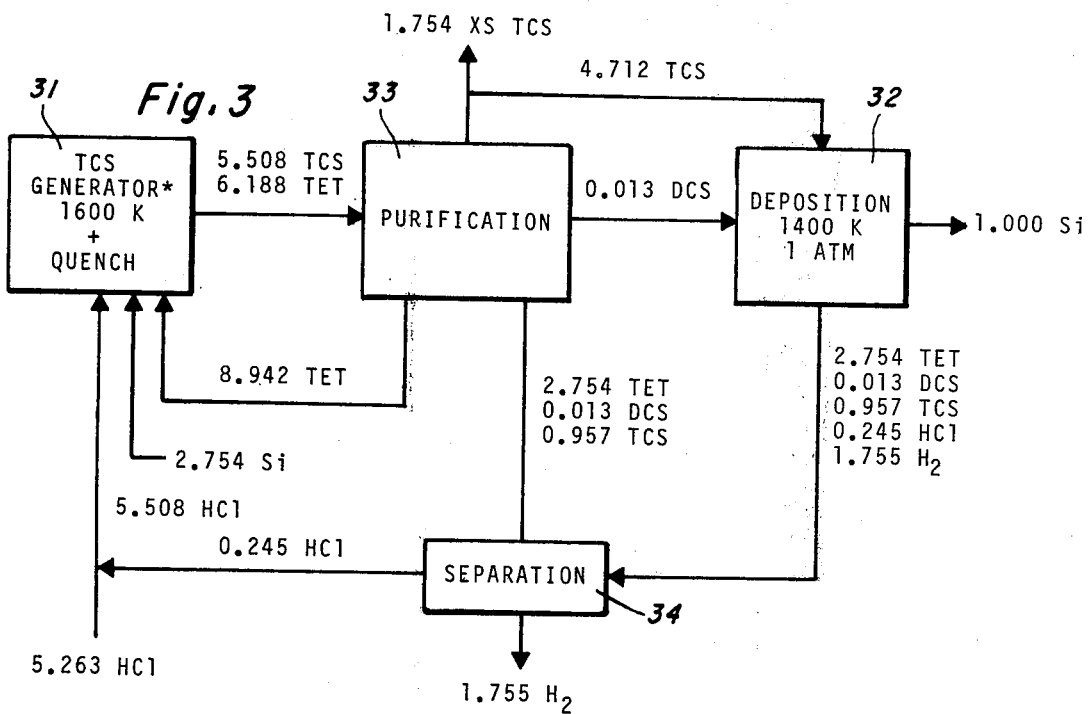
FIG. 3 shows an alternate embodiment, for producing TCS and hydrogen, in addition to silicon.

In FIG. 3 a modification of the system is shown wherein 2.754 moles of silicon are charged to generator 31 for each mole of semiconductor grade silicon produced in deposition reactor 32. The excess silicon, and HCl continuously added in the quenching stage of TCS generation, are transformed to TCS and $H_2$, withdrawn from distillation system 33 and separator 34, respectively. The numbers labeling the flow streams are mols of the indicated material.

Although chlorides and chlorosilanes are primarily illustrated and contemplated in accordance with the invention, iodides and bromides are also subject to the same processing.

Similarly, TCS generator 11 is subject to considerable modification without departing from the scope of this invention. For example, quenching may be achieved by mixing gaseous or liquid HCl with $SiCl_2$ in the absence of a particulate bed, or in the presence of a particulate bed other than silica. Liquid $SiCl_4$ might also be used to aid the quenching.

What is claimed is:

1. A method for converting silicon tetrachloride to trichlorosilane comprising the steps of:
    reacting silicon tetrachloride with elemental silicon at a temperature above 1400° k to form silicon dichloride, mixing hydrogen chloride with the silicon dichloride so formed to effect a stoichiometric ratio of hydrogen chloride to silicon dichloride of approximately 1:1 then quenching the dichloride-hydrogen chloride mixture to a temperature below 800° C, thereby forming trichlorosilane without polymer formation.

2. A method as in claim 1 wherein $H_2$ is added to the reaction of silicon with the tetrachloride to enhance the yield of trichlorosilane.

3. A method as in claim 2 wherein the quenching is completed within one-half second.

4. A method as in claim 1 wherein the quenching is completed within one-half second.

5. A method for converting metallurgical grade silicon to semiconductor grade silicon comprising the steps of:
    reacting metallurgical grade silicon above 1400° K with silicon tetrachloride and hydrogen to form silicon dichloride; mixing hydrogen chloride with the silicon dichloride so formed to effect a stoichiometric ratio of hydrogen chloride to silicon dichloride of approximately 1:1
    quenching the dichloride-hydrogen chloride mixture to a temperature below 800° C within two seconds to form trichlorosilane, without polymer formation;
    purifying the trichlorosilane;
    converting the trichlorosilane in a deposition reactor to semiconductor grade silicon and an effluent consisting essentially of hydrogen, hydrogen chloride, silicon tetrachloride and unreacted trichlorosilane; and then
    separating the tetrachloride and hydrogen from the effluent and recycling said tetrachloride to react with additional metallurgical grade silicon.

6. A method as in claim 5 wherein the quenching is completed within one-half second.

* * * * *